Figure 8:
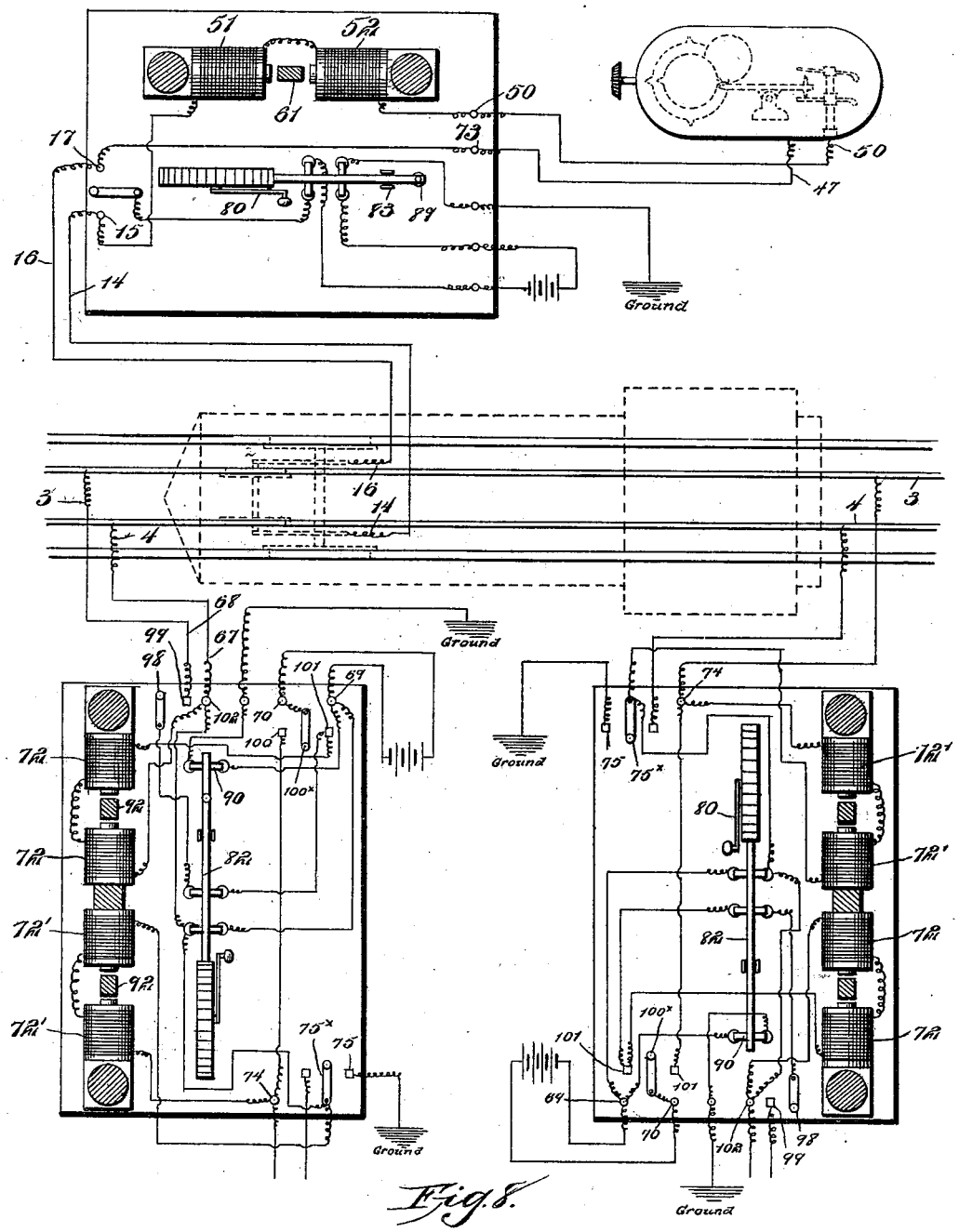

No. 656,029. Patented Aug. 14, 1900.
V. LETO.
ELECTRIC AUTOMATIC CONTROLLER AND INDICATOR FOR RAILWAYS.
(Application filed Sept. 14, 1899.)
(No Model.) 5 Sheets—Sheet 1.
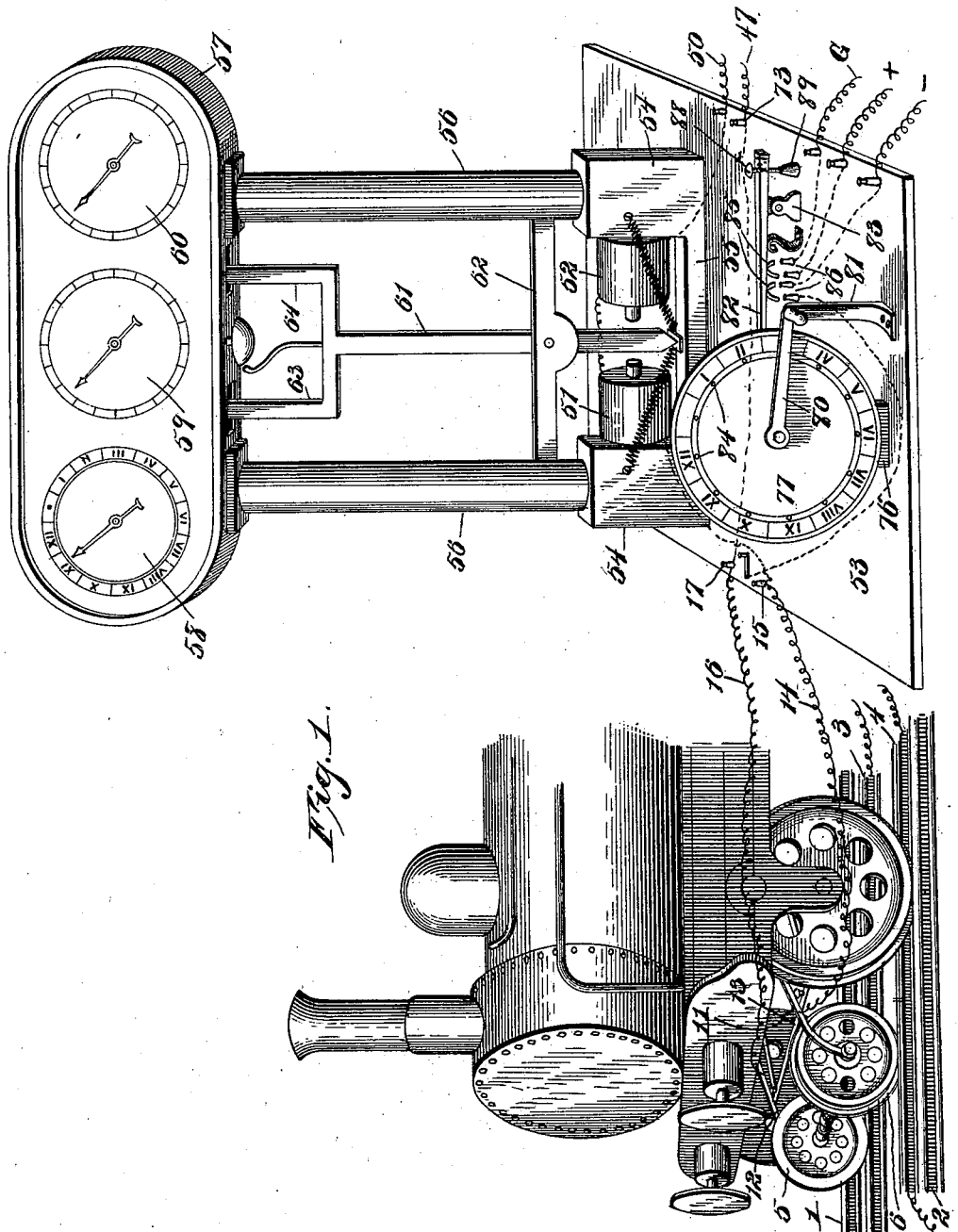
WITNESSES
INVENTOR
Vito Leto
By Victor J. Evans
Attorney No. 656,029. Patented Aug. 14, 1900.
V. LETO.
ELECTRIC AUTOMATIC CONTROLLER AND INDICATOR FOR RAILWAYS.
(Application filed Sept. 14, 1899.)
(No Model.) 5 Sheets—Sheet 2.
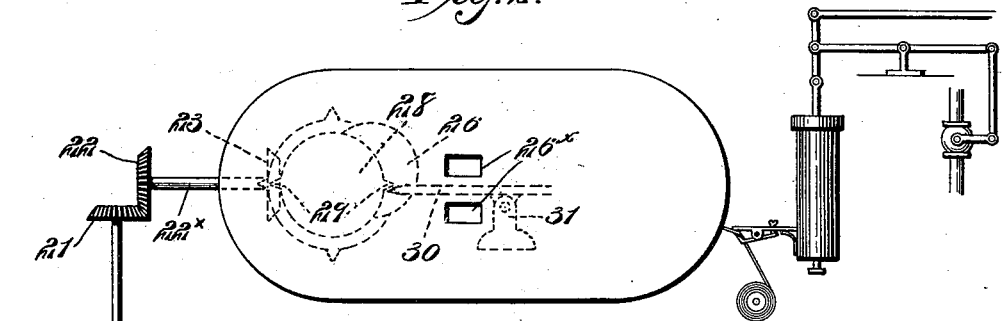
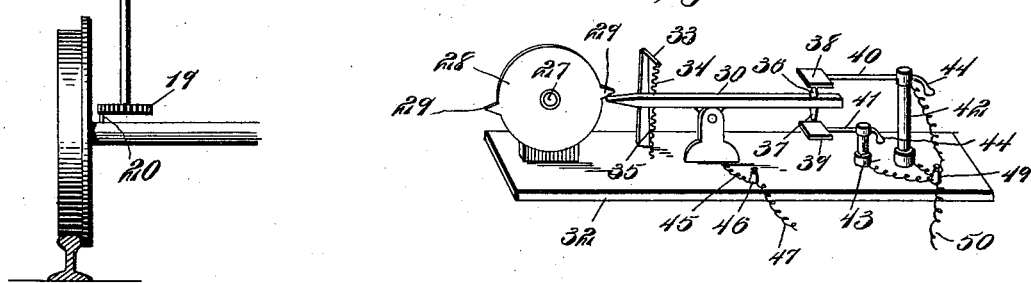
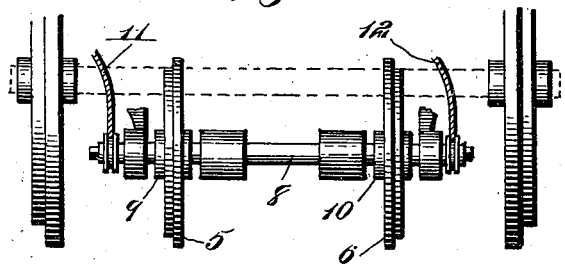
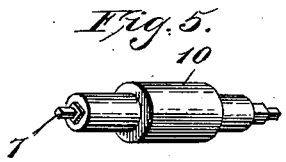
Witnesses
Louis D. Heinrichs
J. C. M. Cleary
Inventor
Vito Leto
By Victor J. Evans
Attorney No. 656,029. Patented Aug. 14, 1900.
V. LETO.
ELECTRIC AUTOMATIC CONTROLLER AND INDICATOR FOR RAILWAYS.
(Application filed Sept. 14, 1899.)
(No Model.) 5 Sheets—Sheet 3.
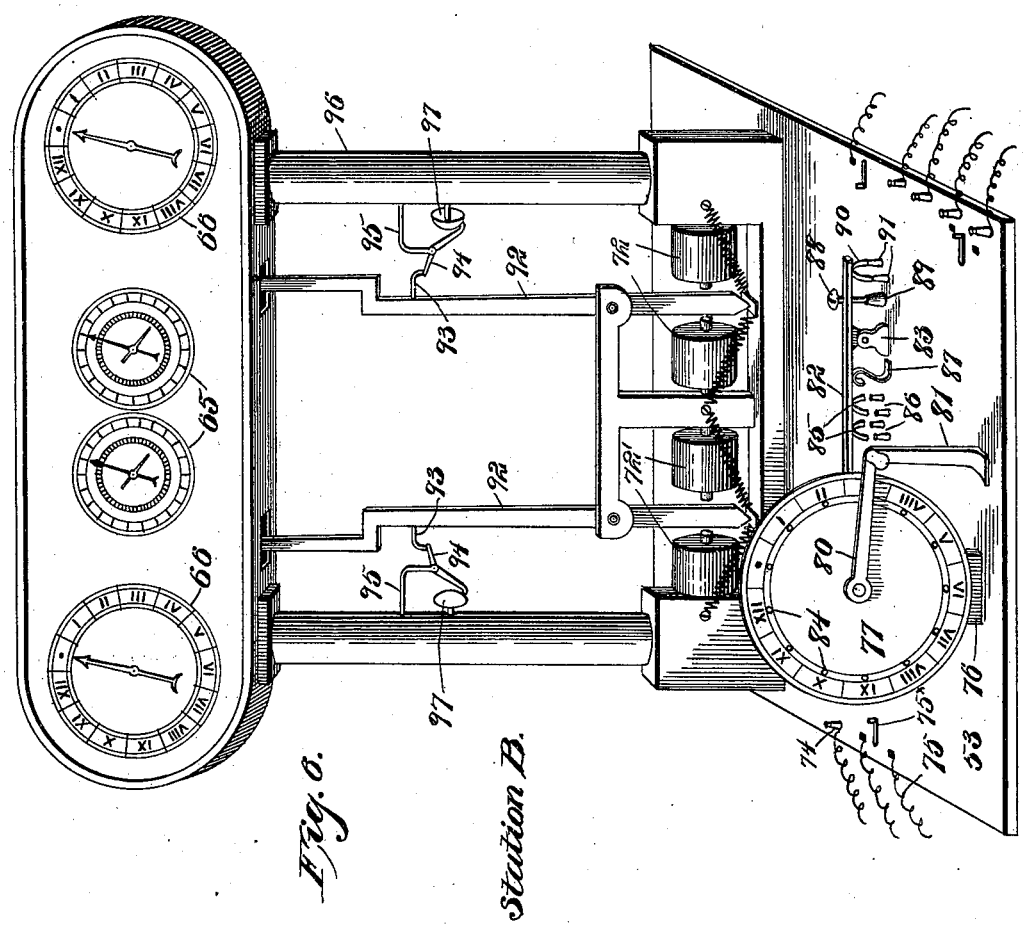
WITNESSES
Louis D. Heinrichs
J. O. McCleary
INVENTOR
Vito Leto
By Victor J. Evans
Attorney No. 656,029. Patented Aug. 14, 1900.
V. LETO.
ELECTRIC AUTOMATIC CONTROLLER AND INDICATOR FOR RAILWAYS.
(Application filed Sept. 14, 1899.)
(No Model.) 5 Sheets—Sheet 4.
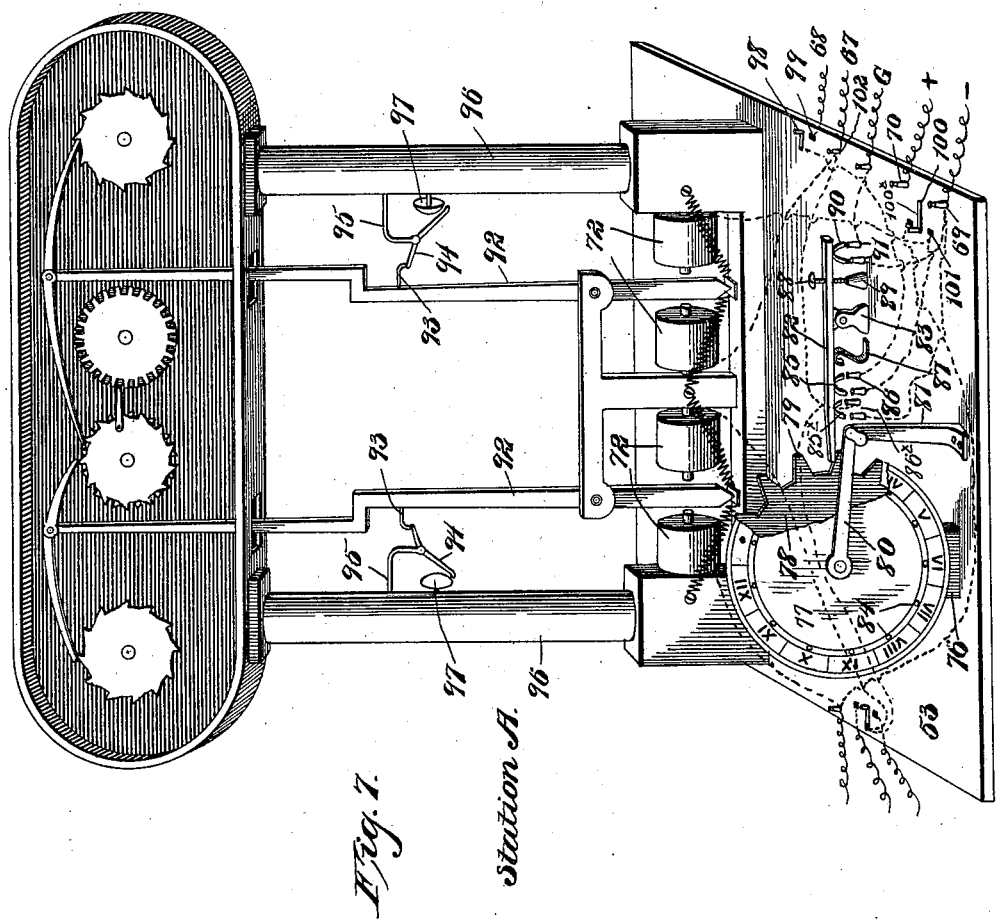
WITNESSES
INVENTOR
Vito Leto
By Victor J. Evans.
Attorney No. 656,029. Patented Aug. 14, 1900.
V. LETO.
ELECTRIC AUTOMATIC CONTROLLER AND INDICATOR FOR RAILWAYS.
(Application filed Sept. 14, 1899.)
(No Model.) 5 Sheets—Sheet 5.

Witnesses
Louis D. Heinrichs
F. D. McCleary

Inventor
Vito Leto
By Victor J. Evans
Attorney

UNITED STATES PATENT OFFICE.

VITO LETO, OF NEWARK, NEW JERSEY.

ELECTRIC AUTOMATIC CONTROLLER AND INDICATOR FOR RAILWAYS.

SPECIFICATION forming part of Letters Patent No. 656,029, dated August 14, 1900.

Application filed September 14, 1899. Serial No. 730,454. (No model.)

*To all whom it may concern:*

Be it known that I, VITO LETO, a subject of the King of Italy, residing at Newark, in the county of Essex and State of New Jersey, have invented certain new and useful Improvements in Electric Automatic Controllers and Indicators for Railways, of which the following is a specification.

My invention relates to controlling, indicating, and signaling mechanism designed primarily for use upon railways.

One object of the invention is to provide an indicator to be located in the cab of a locomotive to automatically indicate the distance traveled.

A further object is to electrically connect the locomotive-indicator with one or more indicators located at stations or points along the road, so that such station-indicators will act synchronously with the indicator upon the locomotive.

A further object of the invention is to provide novel mechanism for telegraphing from the locomotive to the station, and vice versa, by a system of code-numbers representing orders or messages.

The construction of the improved apparatus will be fully described hereinafter in connection with the accompanying drawings and its novel features defined in the appended claims.

In the drawings, Figure 1 is a view in perspective of a portion of a locomotive and its indicator. Fig. 2 is an elevation of indicating mechanism operated from the axle of the locomotive. Fig. 3 is a view in perspective of a portion of the mechanism contained within the casing shown in Fig. 2. Fig. 4 is a detail elevation, partly in section, of the front of the locomotive. Fig. 5 is a detail perspective of the insulated wheel-supports shown in Fig. 4. Fig. 6 is a view in perspective of one of the station-indicators; and Fig. 7 is a similar view of another station-indicator, with parts removed and broken away to expose a part of the internal mechanism. Fig. 8 is a diagrammatic view illustrating the system and its circuit connections.

The reference-numerals 1 and 2 designate the usual rails of a railway-track, and between these rails, secured upon the ties, are two parallel rails 3 and 4, serving as conductors for the electric current between the stations and locomotive.

In front of the locomotive are supported two wheels 5 and 6, insulated from each other and from the metallic parts of the engine and serving as current-collectors or traveling contacts between the conductor-rails 3 and 4 and an indicating apparatus carried on the engine. To support and insulate the wheels 5 and 6, I employ a shaft 7, which is square in cross-section, having a covering 8 of hard rubber. Upon this rubber covering, near the ends of the shaft, are secured two metallic sleeves 9 and 10, upon which are mounted the wheels 5 and 6. The ends of the shaft 7 are fixed in bearings formed in the lower ends of metallic arms 11 and 12, secured to but insulated from a cross-bar 13, carried by the engine. The arm 11 is connected by a wire conductor 14 with a binding-post 15 on the instrument carried by the engine, and the arm 12 is connected by a wire 16 with a binding-post 17. The rails 3 and 4 are electrically connected with the station instrument and its battery, as will be explained hereinafter, and the circuit between the station instrument and engine instrument is normally closed to permit of telegraphic communication by the improved transmitting instrument referred to hereinafter.

In Fig. 2 I show indicating mechanism which constitutes the subject-matter of a separate application for Letters Patent filed by me under date of August 21, 1899, Serial No. 727,977, and consisting of a vertical shaft 18, carrying a sprocket-wheel 19 at its lower end, adapted to be struck by a pin 20, projecting from one of the axles of the engine. The upper end of the shaft 18 carries a bevel gear-wheel 21, meshing with a bevel-gear 22, mounted upon a horizontal shaft $22^\times$. Another bevel-gear 23 drives a wheel 24, provided with equidistant pins 25, which are adapted to successively strike the teeth of a roller 26 to revolve the latter. The movement of the roller operates to advance a ribbon bearing numerals from a delivery-roll to a receiving-roll to expose a portion of the ribbon opposite an opening 26× in the casing which contains the ribbon-roller and other parts to indicate the distance traveled, all as fully set forth in the application above referred to.

Upon the shaft 27 of the actuating-wheel 24 of the indicator and in front of the latter is mounted a disk 28, formed at diametrically-opposite points with two teeth 29, which are adapted to strike the end of a lever 30, fulcrumed upon a bracket 31, rising from a base 32.

33 designates an angle-arm projecting from the base 32, to which is secured one end of a coil-spring 34, the other end of which is secured to the upper side of the lever 30. A second coil-spring 35 connects the under side of the lever 30 with the base 32, and these springs serve to retract the lever to its normal position after it has been moved by the wheel 28. The end of the lever 30 opposite to that which receives the contact of the wheel 28 is formed on opposite sides with pins 36 and 37, adapted to contact with plates 38 and 39, supported upon arms 40 and 41, respectively pivoted upon posts 42 and 43 and each provided with a handle 44 for moving the plates away from the contact-pins of the lever 30. The lever 30 is connected by a wire 45 with a binding-post 46, from which a wire 47 leads to the binding-post 17, and the contact-plates are each connected by branch wires 48 and 49, the arms 40 and 41, and the posts 42 and 43 with a conductor 50, leading through electromagnets 51 and 52 to the binding-post 15 on the train instrument, Fig. 1.

Referring now to Fig. 1, which shows the train instrument in perspective, 53 designates a base or support upon which is secured a frame consisting of vertical blocks 54, connected by a transverse bar 55. From each of the blocks 54 rises a standard 56, supporting the casing 57 of an indicator, which is provided with three dials 58, 59, and 60. The dial 58 is the telegraph-indicator, as will be referred to hereinafter, and the dials 59 and 60 are for indicating the distance traveled by the train.

61 designates a pendulum-armature pivotally supported upon a cross-bar 62, secured between the standards 56. The upper end of this pendulum 61 is bifurcated to form arms 63 and 64, which are provided with pawls (similar to those shown in Fig. 7) to engage the ratchet-wheels of the indicating mechanism. Each of the main stations along the road will be provided with an instrument similar to that shown in Figs. 6 and 7 and having two dials 65 for indicating distance and two telegraph-dials 66 for indicating messages. This duplication of dials adapts the instrument for double tracks and trains moving in opposite directions.

The electromagnets 51 and 52, Fig. 1, are of opposite polarity, so that one attracts and the other repels the pendulum-armature. The speed-indicator is operated automatically, and the current from station A passes to the train entering the coil 51 and issuing from the coil 52 and after passing through the interrupter goes to station B. The pendulum-armature is attracted by the electromagnet 51, and its upper end forces a pawl (similar to the pawl shown in Fig. 7) into engagement with the toothed wheel of the indicator 59, moving said wheel the distance of one tooth without moving the wheel of dial 58. As soon as the current is interrupted the pendulum-armature drops to a perpendicular position and retracts the pawl, which drops by gravity behind the next tooth, ready to move said tooth forward as soon as the circuit is again closed through the magnet 51. In these movements no pressure is brought to the left or toward the dial 58, and the latter is not affected. When a signal is telegraphed, the current passes from the button 50 to the coil 52, thence to the coil 51, so that the polarity of the magnets 51 and 52 will be opposite to that which they had before, and in consequence the pendulum-armature will be attracted by the magnet 52, and its upper end 63 will move toward the left, causing the wheel of the signal-dial 58 to move, but not actuating the wheel of the dial 59. The arm 64 of the armature 61 performs no function, but merely contributes symmetry to the structure.

The rotation of the wheel 28 causes one of its teeth 29 to strike the end of the lever 30 to move one or the other of the pins 36 and 37 away from its contact-plate 38 39, thus breaking the circuit. The levers 40 and 41 are adapted to be turned on their pivotal supports by means of the handles 44, one of said plates being adapted for use when the train travels forward and the other when the train travels backward. It is necessary, therefore, that the engineer swing one or the other of the plates 38 and 39 away from the lever 30 before starting the train.

The rails 3 and 4, Fig. 1, are connected electrically by conductors 67 and 68, Figs. 1 and 7, with the station instrument and its battery, so that the circuit is always closed except when instantaneously broken by the movement of the wheel 28, as above explained, and thus the circuit is adapted to receive a counter-current for telegraphing at all times, except when it is interrupted as above described.

Each station has an electric battery, and the negative pole is in connection with the push-button 69, from whence the current passes to 91 90 and the button G to ground. The positive pole is connected with 70, which is connected with the commutator 100×, which may be brought in contact with 100 or 101, accordingly as it is desired to communicate with the train at the right or left of the station. Ordinarily the contact is with 101, and the current from 70 will go to 101 and thence to the coils 72 and thence to the contact-button 67 and through the track 4, the wheel 6, and the contact-wire 14, the button 15, and thence to the coils 51 and 52 to the button 50 and the conductor 49 to the lever 30 and standard 31 to 46, thence through 47, the buttons 73 and 17, the wire 16, the wheel 5, the track 3, the button 74, (station B, Fig. 6,) thence to the coils 72', the commutator $75^\times$, the button 75, (commutator $75^\times$ and button 75 are always in contact,) and thence to ground, thus completing the circuit.

Each complete revolution of the wheel 28 corresponds to a predetermined distance—say one thousand yards—so that the circuit to the indicator is broken at each half-turn of the wheel 28 or at every five hundred yards of travel of the train.

The telegraphic apparatus with which each of the instruments is provided consists of a post or standard 76, rising from the base 53, a dial-wheel 77, centrally pivoted upon the post 76 and formed with a circular extension or projection 78, Fig. 7, on its rear side, formed with thirteen peripheral teeth 79, a pointer 80, loosely pivoted at one end to the center arbor of the dial-wheel, a stop-post 81, rising from the base to support the free end of the pointer 80, and a lever 82, fulcrumed upon a bracket 83, projecting from the base 53 and provided with contacts, which will be described hereinafter. The dial-wheel 77 is divided into thirteen spaces, twelve of which are numbered from "1" to "12," while the remaining space is left blank. Opposite each space on the dial is a hole 84 to receive a pin projecting from the rear side of the pointer 80.

On the under side of the lever 82, between the bracket 83 and the wheel 77, are arranged two curved plates 85, of platinum, which coact with four small vessels 86, containing mercury, and a spring 87 below the lever 82 keeps the plates 85 normally out of contact with the mercury vessels.

To the right of the bracket 83 a screw 88 extends through the lever 82 to contact with a stop 89 to limit the movement of the lever 82, and at the end of said lever, adjacent to the screw 88, is a curved platinum contact-plate 90, coöperating with mercury vessels 91.

Instead of the mercury vessels and curved contact-plates above described I may employ any form of metallic contacts.

Each of the numbers shown upon the dial-wheel 77 represents a predetermined order or signal, and said numbers correspond to similar numbers upon the receiving-dials 66 of the instrument.

The following list of orders or signals will illustrate the telegraphic signaling system, although the signals or messages may of course be varied at will.

1. Go back.
2. Increase speed.
3. Decrease speed.
4. Stop.
5. Accident occurred.
6. No casualty.
7. Hurry up sanitary service.
8. Send an engine.
9. Engine derailed.
10. Obstacle on the track.
11. Robbery on train.
12. Snow impedes speed.

Any one of the foregoing messages may be transmitted by the telegraphic apparatus shown and described in the following manner: When it is desired to telegraph from one of the stations to the moving train, or vice versa, the pointer or lever 80 of the transmitting device is set opposite the number on the wheel 77 which represents the order to be telegraphed, and the wheel is then rotated from left to right until the pointer 80 strikes the stop 81. This movement of the wheel 77 will depress the lever 82 a number of times corresponding to the number opposite the pointer 80, the result being that the pointer of the telegraph-dial 66 of the receiving instrument will be moved to the number on the receiving-dial corresponding to that on the transmitting-wheel opposite which the pointer 80 is located. The pendulum-armatures 92 of the station instruments are each provided with an arm 93, adapted to contact with a bell-crank lever 94, fulcrumed on a bracket 95, secured to one of the standards 96, and adapted to strike a bell 97, secured to the standard, at each movement of the armatures 92, thus notifying the engineer or operator that a message is being transmitted.

In telegraphing from the station A, Fig. 7, to the train instrument, Fig. 1, the operator moves the switch 98 to the contact 99 and then sets the lever 80 to the proper position and moves the wheel 77. At each contact of a tooth of the wheel 77 with the lever 82 the plates 85 are pressed into contact with the vessels 86 and the contact between the points 90 and 91 is broken. At every depression of the lever 82 the current from the battery goes to the point 70, then to the switch $100^\times$, thence to the point 101, the vessels 86, the plate 85, the vessel $86^\times$, the switch 98, the point 99, the wire 68, and thence to the rail 3. The circuit from the rail 3 is through the wheel 5, the wire 16, binding-post 17 to the receiver on the train, passing through post 73 to the interrupter mechanism, thence back through the conductor 50 to the magnets 52 and 51 to operate the armature 61, and through the post 15, the wire 14, the wheel 6, rail 4, back to station A, through post 102, plates 85, vessel 86, back to battery to complete the circuit. The pointer 80 has on its inner face a pin which is adapted to enter the holes 84, so that the pointer and the wheel will move together when the pointer is moved from left to right. The switch $100^\times$ is normally kept on the point 101 and is connected by a wire with the binding-post 70.

In telegraphing from station B to the train or from the train to either of the stations the operation is similar to that just described, although the electric circuits will of course vary.

While I have described the improvement as applied to railway-trains, for which it is primarily designed, I would have it understood that the controller is also well adapted for use with machinery in mills or other plants to connect the same with the office of the proprietor or manager.

To insure accuracy of operation and avoid jarring of the mechanism by the motion of the train, I preferably support the instrument carried by the train upon spring-supports.

I claim—

1. In a controller, indicating and signaling apparatus for railway-trains, the combination with an instrument carried by the train provided with distance-indicating dials, and a dial for telegraphic messages; of a station instrument having dials corresponding to those on the train instrument; a telegraph-transmitter comprising a rotary wheel having numbers thereon corresponding to those on the telegraphic indicating-dial, a pointer or lever for rotating said transmitter-wheel, and electrical devices operated by the transmitter-wheel for moving the pointer of the telegraphic-dial indicator.

2. In a controlling and indicating apparatus for railways; the combination with an instrument carried on a train, and a station instrument, of conductor-rails between the track-rails; current-collectors supported in front of the locomotive and in circuit with both instruments; a telegraphic transmitter-wheel on each instrument provided with teeth; a pointer or lever provided with means for engaging the transmitter-wheel; a circuit-closing lever adapted to be depressed by the teeth of the transmitter; and circuit-closing contacts below said circuit-closing lever.

3. In a controlling and indicating apparatus for railways, the combination with an instrument carried by the train, and a station instrument, of a normally-closed electric circuit connecting the two instruments; pendulum-armatures, electromagnets of opposite polarity for operating said armatures; ratchet-wheels and indicating-pointers; a toothed telegraphic transmitter-wheel for each instrument; a circuit-closing lever operated by the transmitter-wheel; and signal-bells operated by the movement of the pendulum-armature.

4. In a controlling and indicating apparatus, the combination with indicating-dials, pendulum-armatures carrying wheel-actuating pawls, and electromagnets, of a circuit-breaking device comprising a mechanically-operated wheel provided with equidistant teeth; a lever adapted to be struck by the teeth of the wheel; contact-pins projecting from opposite sides of the lever, and pivotally-supported arms carrying contact-plates coacting with said contact-pins.

5. In a controlling and indicating apparatus, the combination with a plurality of indicating instruments, each provided with ratchet-wheels and means for actuating said wheels, of a telegraphic transmitter-wheel provided with teeth and bearing numbers corresponding to numbers upon an indicating-dial upon the indicator, and provided with a hole opposite each number; a pointer or lever pivotally secured at one end to the center of the transmitter-wheel; a stop-post for the free end of the pointer or lever; a circuit-closing lever adapted to be depressed by the teeth of the transmitter-wheel, and circuit-closers below said circuit-closing lever.

In testimony whereof I affix my signature in presence of two witnesses.

VITO LETO.

Witnesses:
 WM. L. FORD,
 F. MAURO.